(12) United States Patent
Hendry et al.

(10) Patent No.: US 10,448,039 B2
(45) Date of Patent: *Oct. 15, 2019

(54) IMAGE DECODING METHOD AND APPARATUS USING SAME

(71) Applicant: LG Electronics Inc., Seoul (KR)

(72) Inventors: Hendry Hendry, Seoul (KR); Jungsun Kim, Seoul (KR); Chulkeun Kim, Seoul (KR); Byeongmoon Jeon, Seoul (KR); Sangoh Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,304

(22) Filed: Oct. 3, 2017

(65) Prior Publication Data

US 2018/0027253 A1 Jan. 25, 2018

Related U.S. Application Data

(63) Continuation of application No. 14/352,400, filed as application No. PCT/KR2013/005207 on Jun. 12, 2013, now Pat. No. 9,794,582.

(Continued)

(51) Int. Cl.
*H04N 19/44* (2014.01)
*H04N 19/70* (2014.01)
(Continued)

(52) U.S. Cl.
CPC ........... *H04N 19/44* (2014.11); *H04N 19/188* (2014.11); *H04N 19/31* (2014.11); *H04N 19/70* (2014.11)

(58) Field of Classification Search
CPC ...... H04N 19/188; H04N 19/31; H04N 19/44; H04N 19/70
(Continued)

(56) References Cited

U.S. PATENT DOCUMENTS 8,649,441 B2 * 2/2014 Hong ..................... H04N 19/70
375/240.25
2007/0110150 A1 5/2007 Wang et al.
(Continued)

FOREIGN PATENT DOCUMENTS

CN 1941913 4/2007
CN 101036392 9/2007
(Continued)

OTHER PUBLICATIONS

International Search Report dated Sep. 26, 2013 for Application No. PCT/KR2013/005207, with English Translation, 4 pages.
(Continued)

*Primary Examiner* — William C Vaughn, Jr.
*Assistant Examiner* — Naod W Belai
(74) *Attorney, Agent, or Firm* — Fish & Richardson P.C.

(57) ABSTRACT

The present invention includes an image information decoding method which comprises: a step of receiving a bitstream that includes a network abstraction layer (NAL) unit including information related to an encoded image; and a step of parsing an NAL unit header of the NAL unit. The NAL unit header includes layer information including reserved_one_5bits for identifying an extended layer in an extended bitstream and temporal_id for identifying a temporal layer of a bitstream. The reserved_one_5bits of the layer information is received prior to the temporal_id of the layer information. Thus, a method for describing scalability information in a hierarchical bitstream is provided.

13 Claims, 10 Drawing Sheets

Related U.S. Application Data

(60) Provisional application No. 61/658,422, filed on Jun. 12, 2012, provisional application No. 61/658,421, filed on Jun. 12, 2012.

(51) Int. Cl.
   *H04N 19/31* (2014.01)
   *H04N 19/169* (2014.01)

(58) Field of Classification Search
   USPC .................................................. 375/240.25
   See application file for complete search history.

(56) References Cited

U.S. PATENT DOCUMENTS

| 2009/0175353 | A1 | 7/2009 | Suh et al. |
| 2009/0187960 | A1 | 7/2009 | Lee et al. |
| 2010/0111165 | A1 | 5/2010 | Kim et al. |
| 2012/0027316 | A1 | 2/2012 | Wang et al. |
| 2012/0106634 | A1 | 5/2012 | Jeon et al. |
| 2012/0183077 | A1* | 7/2012 | Hong .................... H04N 19/70 375/240.25 |
| 2013/0272430 | A1 | 10/2013 | Sullivan et al. |

FOREIGN PATENT DOCUMENTS

| CN | 101223783 | 7/2008 |
| CN | 101317460 | 12/2008 |
| CN | 101529911 | 9/2009 |
| CN | 101543018 | 9/2009 |
| CN | 102176752 | 9/2011 |
| JP | 2010187302 | 8/2010 |
| JP | 2011223626 | 11/2011 |
| KR | 10-2008-0066624 | 7/2008 |
| KR | 10-2009-0079838 | 7/2009 |
| KR | 10-2010-0048696 | 5/2010 |
| KR | 10-2012-027194 | 3/2012 |
| KR | 101626522 | 6/2016 |
| WO | 2007042916 | 4/2007 |
| WO | 2008085013 | 7/2008 |
| WO | 2010123198 | 10/2010 |

OTHER PUBLICATIONS

Boyce et al., "Parameter Sets Modifications for Temporal Scalability and Extension Hooks", Joint Collaborative Team on Video Goding (JCT-VC) of ITU-T SG 16 WP 3 and ISO/IEC JTC 1/SC 29/WG 11, 91h Meeting: Geneva, CH, Apr. 27-May 7, 2012 (JCTVC-I0230v3), 9 pages.

Bross et al., "High Efficiency Video Goding (HEVC) Text Specification Drall 10 (for FDIS & Last Call)", Joint Collaborative Team on Video Goding (JCT-VC) of ITU-T SG 16 WP 3 and ISO/IEC JTC 1/SC 29/WG 11, 121h Meeting: Geneva, CH, Jan. 14-23, 2013(JCTVC-L1003_v34), 309 pages.

Choi et al., "NLA Uni! Header for Scalable Extension", Joint Collaborative Team on Video Goding (JCT-VC) of ITU-T SG 16 WP 3 and ISO/IEC JTC 1/SC 29/WG 11, 91h Meeting: Geneva, CH, Apr. 27-May 7, 2012 (JCTVC-I0132), 5 pages.

Sullivan et al., "Overview of the High Efficiency Video Goding (HEVC) Standard", IEEE Transactions on Circuits and Systems for Video Technology, vol. 22, No. 12, Dec. 2012, 20 pages.

Sullivan, Gary J., "CRA pictures with broken links," Joint Collaborative Team on Video Coding (JCT-VC) of ITU-T SG 16 WP 3 and ISO/IEC JTC1/SC29/WG11, May 2012, 9th Meeting, 3 pages.

Wang, Ye-Kui, "On allocation of NAL unit types," Joint Collaborative Team on Video Coding (JCT-VC) of ITU-T SG 16 WP 3 and ISO/IEC JTC1/SC29/WG11, May 2012, 9th Meeting, 4 pages.

* cited by examiner

IMAGE DECODING METHOD AND APPARATUS USING SAME

CROSS REFERENCE TO RELATED APPLICATIONS

This application is a continuation of U.S. application Ser. No. 14/352,400, filed on Apr. 17, 2014, now allowed, which is a U.S. National Phase application under 35 U.S.C. § 371 of International Application PCT/KR2013/005207, filed Jun. 12, 2013, which claims the benefit of U.S. Provisional Application No. 61/658,421 and U.S. Provisional Application No. 61/658,422, both filed on Jun. 12, 2012, the entire content of prior applications is hereby incorporated by reference.

TECHNICAL FIELD

The present invention relates to a video compression technique, and more particularly, to a method and an apparatus for decoding video information in a bitstream.

BACKGROUND ART

Recently, demands for high-resolution and high-quality images have increased in various fields of applications. As images have higher resolution and higher quality, the amount of information on the images also increases.

With a growing amount of information, multi-functional devices and networks with various environments are introduced. Accordingly, the same content may be utilized with different levels of quality.

Specifically, as terminals are able to support diverse qualities of videos and various network environments are established, a video with general quality is enabled in one environment while a higher-quality video may be available in another environment.

For example, a user may enjoy video content purchased through a portable terminal on a large-screen display with higher resolution at home.

In recent years, as high definition (HD) broadcast services are available, a large number of users is getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

DISCLOSURE

Technical Problem

An aspect of the present invention is to provide a method and an apparatus for describing scalability information in a scalable bitstream.

Another aspect of the present invention is to provide a method and an apparatus for expressing scalability information on a bitstream in a flexible manner.

Still another aspect of the present invention is to provide a method and an apparatus for simplifying a vide coding layer type in a bitstream.

Technical Solution

An embodiment of the present invention provides a method of decoding video information, the method including receiving a bitstream including a network abstraction layer (NAL) unit including information on an encoded video; and parsing an NAL unit header of the NAL unit, wherein the NAL unit header comprises layer information including reserved_one_5bits to identify an extended layer in an extended bitstream and temporal_id to identify a temporal layer of a bitstream, and reserved_one_5bits is received before termporal_id.

reserved_one_5bits and termporal_id may be simultaneously parsed.

Another embodiment of the present invention provides a method of decoding video information, the method including receiving a bitstream including a network abstraction layer (NAL) unit including information on an encoded video, and parsing an NAL unit header of the NAL unit, wherein the NAL unit header includes NAL unit type information corresponding to an NAL unit type, and the NAL unit type includes a clean random access (CRA) picture that is a picture as a random access point when a picture group (Group of Picture) has an open structure and a broken link access (BLA) picture present in a middle of a bitstream as a random access point when coded pictures are spliced or the bitstream is broken in the middle.

The CRA picture may have one NAL unit type regardless of a leading picture which is output before a picture as a random access point and decoded after the picture as the random access point.

A leading picture which is output before a picture as a random access point and decoded after the picture as the random access point may not be present after the BLA picture.

A leading picture which is not decoded but removed among leading pictures output before a picture as a random access point and decoded after the picture as the random access point may not be present after the BLA picture.

Advantageous Effects

An embodiment of the present invention provides a method and an apparatus for describing scalability information in a scalable bitstream.

Another embodiment of the present invention provides a method and an apparatus for expressing scalability information on a bitstream in a flexible manner.

Still another embodiment of the present invention provides a method and an apparatus for simplifying a vide coding layer type in a bitstream.

MODE FOR INVENTION

Figure 1:
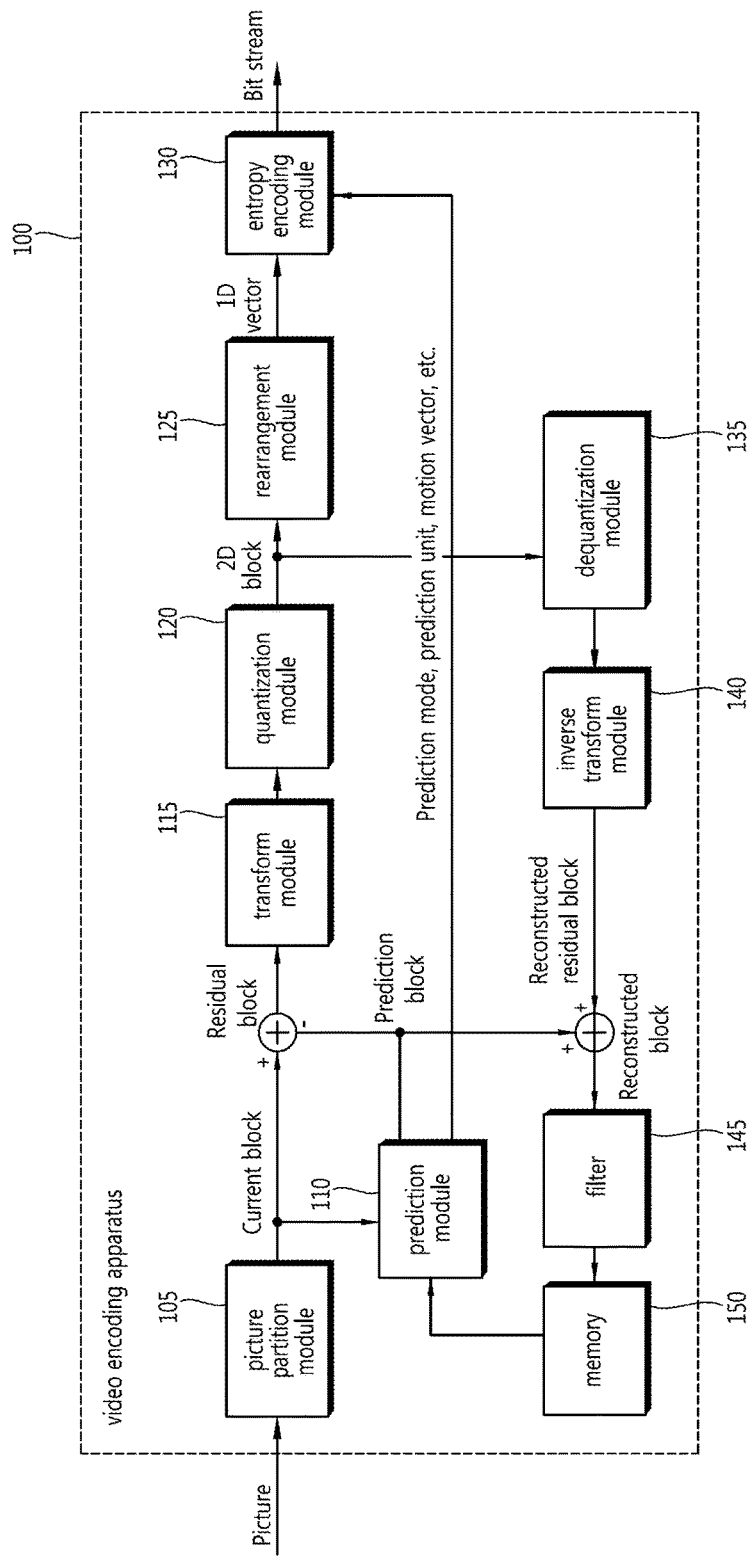
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in the video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. A scalable video encoding/decoding method or apparatus may be realized by extension of a general video encoding/decoding method or apparatus that does not provide scalability, and FIG. 1 illustrates an example of a video encoding apparatus as a base of a scalable video encoding apparatus.

Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter 145 and a memory 150.

The picture partition module 105 may divide an input picture into at least one block as a process unit. Here, the block as the process unit may be a prediction unit (PU), a transform unit (TU) or a coding unit (CU).

Process unit blocks divided by the picture partition module 105 may have a quadtree structure.

The prediction module 110 may include an inter prediction module to perform inter prediction and an intra prediction module to perform intra prediction, which will be described. The prediction module 110 generates a prediction block by performing prediction on the process unit of the picture from the partition module 105. The process unit of the picture in the prediction module 110 may be a CU, a TU or a PU. Furthermore, the prediction module 110 may determine whether prediction performed on the process unit is inter prediction or intra prediction, and may determine details (for example, prediction mode) of each prediction method. Here, a process unit on which prediction is performed may be different from a process unit for which a prediction method and details on the prediction methods are determined. For example, a prediction method and a prediction mode may be determined for each PU, while prediction may be performed on each TU.

In inter prediction, a prediction block may be generated by performing prediction based on information on at least one of previous and/or subsequent pictures of the current picture. Furthermore, in intra prediction, a prediction block may be generated by performing prediction based on information on a pixel within the current picture.

A skip mode, a merge mode and a motion vector prediction (MVP) may be used as an inter prediction method. In inter prediction, a reference picture for a PU may be selected, and a reference block corresponding to the PU may be selected. The reference block may be selected in an inter pixel unit. Subsequently, a prediction block that has a minimum residual signal with respect to the current PU and has a minimum-size motion vector is generated.

The prediction block may be generated in an integer sample unit or in a pixel unit smaller than an integer pixel, such as a ½ pixel unit and a ¼ pixel unit. Here, the motion vector may be represented in a unit smaller than an integer pixel.

Information on the reference pixel selected in inter prediction, such as an index, a motion vector (e.g., a motion vector predictor) and a residual signal of the reference picture, is subjected to entropy encoding and transferred to a decoding apparatus. In the skip mode, since the prediction block may be a reconstructed block, the residual may not be generated, transformed, quantized and transferred.

In intra prediction, a prediction mode is determined by a PU, and prediction may be performed by a PU. Alternatively, a prediction mode may be determined by a PU, and intra prediction may be performed in a TU.

An intra prediction mode may have 33 directional prediction modes and two or more non-directional modes. The non-directional modes can include a DC prediction mode and a planar mode.

In intra prediction, the prediction block may be generated after applying a filter to a reference sample. Here, whether or not to apply the filter to the reference sample may be determined on an intra prediction mode and/or size of a current block.

A PU may have different sizes and forms. For example, in inter prediction, a PU may be a 2N×2N, 2N×N, N×2N or N×N block (N is an integer). In intra prediction, a PU may be a 2N×2N or N×N block (N is an integer). Here, a PU having an N×N block size may be applied only to a special case. For example, the PU having the N×N block size may be available only for a minimum-size CU or only for intra prediction. In addition to the PUs with the foregoing sizes, the PU may include N×mN, mN×N, 2N×mN and mN×2N blocks (m<1).

A residual value (or a residual block or a residual signal) between the generated prediction block and an original block is input to the transform module 115. Also, information on a prediction mode and information on a motion vector used for the prediction, along with the residual value, are encoded by the entropy encoding module 130 and transferred to the decoding apparatus.

The transform module 115 transforms the residual block by the TU and generates a transform coefficient.

A transform block is a rectangular block of samples, which the same transformation is applied to. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete cosine transform (DCT). Otherwise, the transform module 115 may transform the residual block using discrete sine transform (DST).

The transform module 115 may generate a transform block of transform coefficients by transformation.

The quantization module 120 may generate quantized transform coefficients by quantizing residual values transformed by the transform module 115, that is, the transform coefficients. The coefficients derived by the quantization module 120 are provided to the dequantization module 135 and the rearrangement module 125.

The rearrangement module 125 rearranges the quantized transform coefficients provided by the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may perform entropy encoding on the quantized transform coefficients rearranged by the rearrangement module 125. Various encoding methods, such as exponential Golomb, context-adaptive variable length coding (CAVLC) and context-adaptive binary arithmetic coding (CABAC), may be used in entropy encoding. The entropy encoding module 130 may encode various types of information, such as information on the quantized transform coefficients and block type of a CU, prediction mode information, partition unit information, PU information, transfer unit information, motion vector information, reference picture information, block interpolation information and filtering information received from the rearrangement module 125 and the prediction module 110.

Furthermore, the entropy coding module 130 may apply a change to a received parameter set or syntax as necessary.

The dequantization module 135 performs dequantization on the values (transform coefficients) quantized by the quantization module 120, and the inverse transform module 140 performs inverse transform on the values dequantized by the dequantization module 135.

The residual values generated via the dequantization module 135 and the inverse transform module 140 are merged with the prediction block predicted by the prediction module 110, thereby generating a reconstructed block.

FIG. 1 illustrates that the reconstructed block is generated by merging the residual block with the prediction block through an adder. Here, the adder may be regarded as a separate module for generating the reconstructed block (reconstructed block generation module).

The filter 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value obtained by comparing the reconstructed picture with blocks filtered by the deblocking filter with the original picture. The ALF may be employed only for high efficiency. The SAO reconstructs an offset difference between the residual block to which the deblocking filter has been applied and the original picture by a pixel unit, in which a band offset or an edge offset is used.

Meanwhile, the filter 145 may not apply filtering to a reconstructed block used in inter prediction.

The memory 150 may store the reconstructed block or picture derived through the filter 145. The reconstructed block or picture stored in the memory 150 may be provided to the prediction module 110 performing inter prediction.

Figure 2:
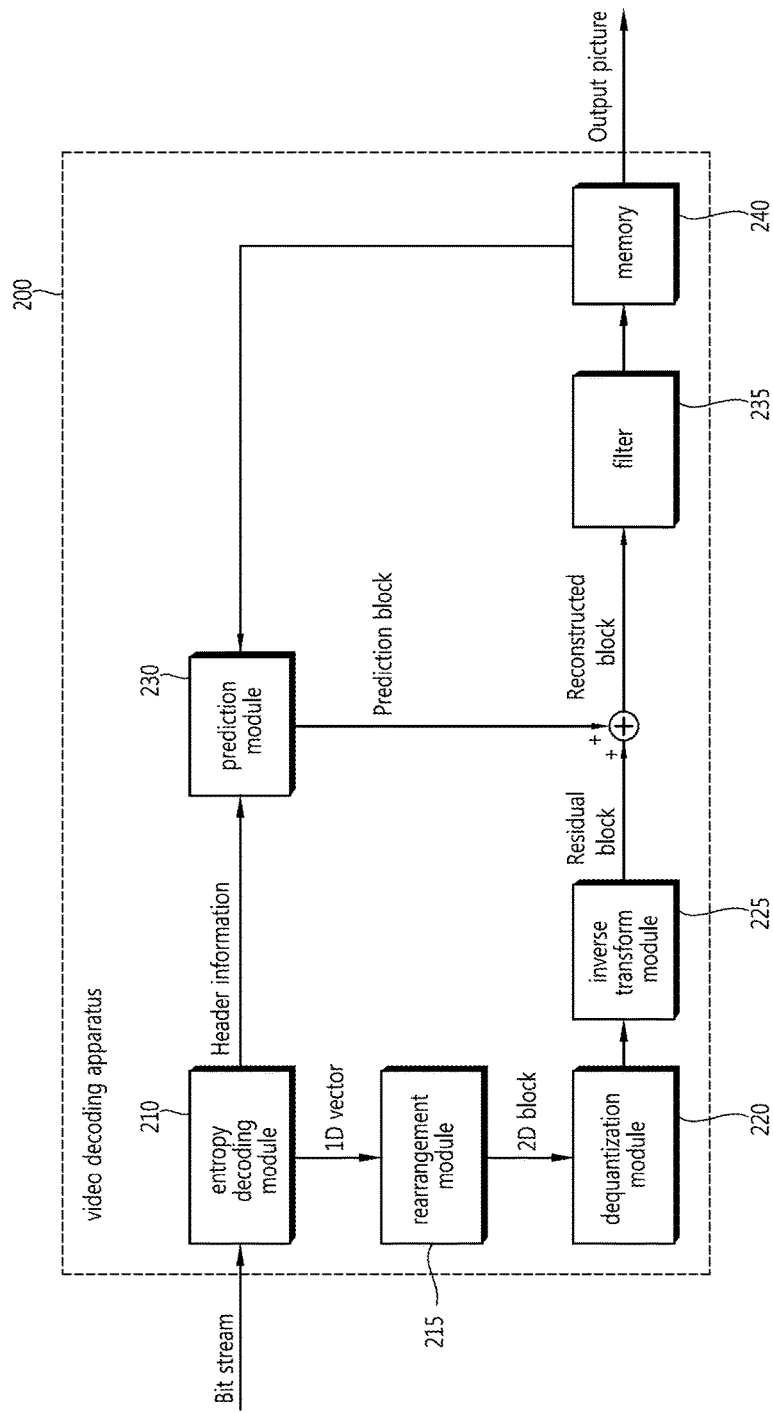
FIG. 2 is a block diagram schematically illustrating a video decoding apparatus according to an exemplary embodiment of the present invention.

FIG. 2 is a block diagram schematically showing a video decoding apparatus according to an exemplary embodiment of the present invention. As described above in FIG. 1, a scalable video encoding/decoding method or apparatus may be realized by extension of a general video encoding/decoding method or apparatus that does not provide scalability, and FIG. 2 illustrates an example of a video decoding apparatus as a base of a scalable video decoding apparatus.

Referring to FIG. 2, the video decoding apparatus 200 may include an entropy decoding module 210, a rearrangement module 215, an dequantization module 220, an inverse transform module 225, a prediction module 230, a filter 235, and a memory 240.

When a video bitstream is input from the video encoding apparatus, the input bitstream may be decoded according to an inverse procedure by which the video encoding apparatus processes video information.

For example, if the video encoding apparatus uses variable length coding (VLC), such as CAVLC, to perform entropy encoding, the entropy decoding module 210 may perform entropy decoding by implementing the same VLC table as used in the encoding apparatus. Furthermore, if the video encoding apparatus uses CABAC to perform entropy ending, the entropy decoding module 210 may also perform entropy decoding using CABAC.

Information for generating a prediction block, among pieces of information decoded by the entropy decoding module 210, may be provided to the prediction module 230. Residual values entropy-decoded by the entropy decoding module 210, that is, quantized transform coefficients, may be input to the rearrangement module 215.

The rearrangement module 215 may rearrange the information on the bitstream entropy-decoded by the entropy decoding module 210, that is, the quantized transform coefficients, based on a rearrangement method used in the encoding apparatus.

The rearrangement module 215 may reconstruct and rearrange coefficients expressed in a 1D vector form into coefficients in a 2D block. The rearrangement module 215 may generate the coefficients in the 2D block (quantized transform coefficients) by scanning the coefficients based on a prediction mode and a size of a transform block applied to the current block (transform block).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus, having been subjected to DCT and DST performed by the transform module of the encoding apparatus.

Inverse transform may be performed on the basis of a transfer unit or a partition unit of a picture determined by the video encoding apparatus. The transform module of the video encoding apparatus may selectively perform DCT and/or DST depending on a plurality of information elements, such as a prediction method, a size of the current block and a prediction direction, and the inverse transform module 225 of the video decoding apparatus may perform inverse transform on the basis of information on the transform performed by the transform module of the video encoding apparatus.

The prediction module 230 may generate a prediction block based on information about generation of the prediction block provided from the entropy decoding module 210 and information on a previously decoded block and/or picture provided by the memory 240.

If a prediction mode for a current PU is an intra prediction mode, intra prediction may be performed based on information on a pixel in a current picture to generate the prediction block.

If a prediction mode for the current PU is an inter prediction mode, inter prediction for the current PU may be performed based on information included in at least one of previous and subsequent pictures of the current picture. Here, motion information necessary for the inter prediction for the current PU provided by the video encoding apparatus, for example, information on a motion vector and an index of a reference picture, may be derived by checking a skip flag and a merge flag received from the encoding apparatus.

A reconstructed block may be generated using the prediction block generated by the prediction module 230 and the residual block provided by the inverse transform module 225. FIG. 2 illustrates that the reconstructed block is generated by merging the prediction block with the residual block by the adder. Here, the adder may be regarded as a separate module for generating the reconstructed block (reconstructed block generation module).

When the skip mode is used, the residual block is not transmitted and the prediction block is the reconstructed block.

The reconstructed block and/or picture may be provided to the filter 235. The filter 235 may apply deblocking filtering, SAO and/or AFL to the reconstructed block and/or picture.

The memory 240 may store the reconstructed picture or block to be used as a reference picture or a reference block and supply the reconstructed picture to an output unit.

Components directly related to video decoding among the entropy decoding module 210, the rearrangement module 215, the dequantization module 220, the inverse transform module 225, the prediction module 230, the filter 235 and the memory 240 of the decoding apparatus 200, for example, the entropy decoding module 210, the rearrangement module 215, the dequantization module 220, the inverse transform module 225, the prediction module 230 and the filter 235 may be defined as a decoder or a decoding unit, separately from the other components.

Further, the decoding apparatus 200 may further include a parsing module (not shown) to parse information about an encoded video included in the bitstream. The parsing module may include the entropy decoding module 210 or be included in the entropy decoding module 210. The parsing module may be provided as one component of the decoding unit.

Figure 3:
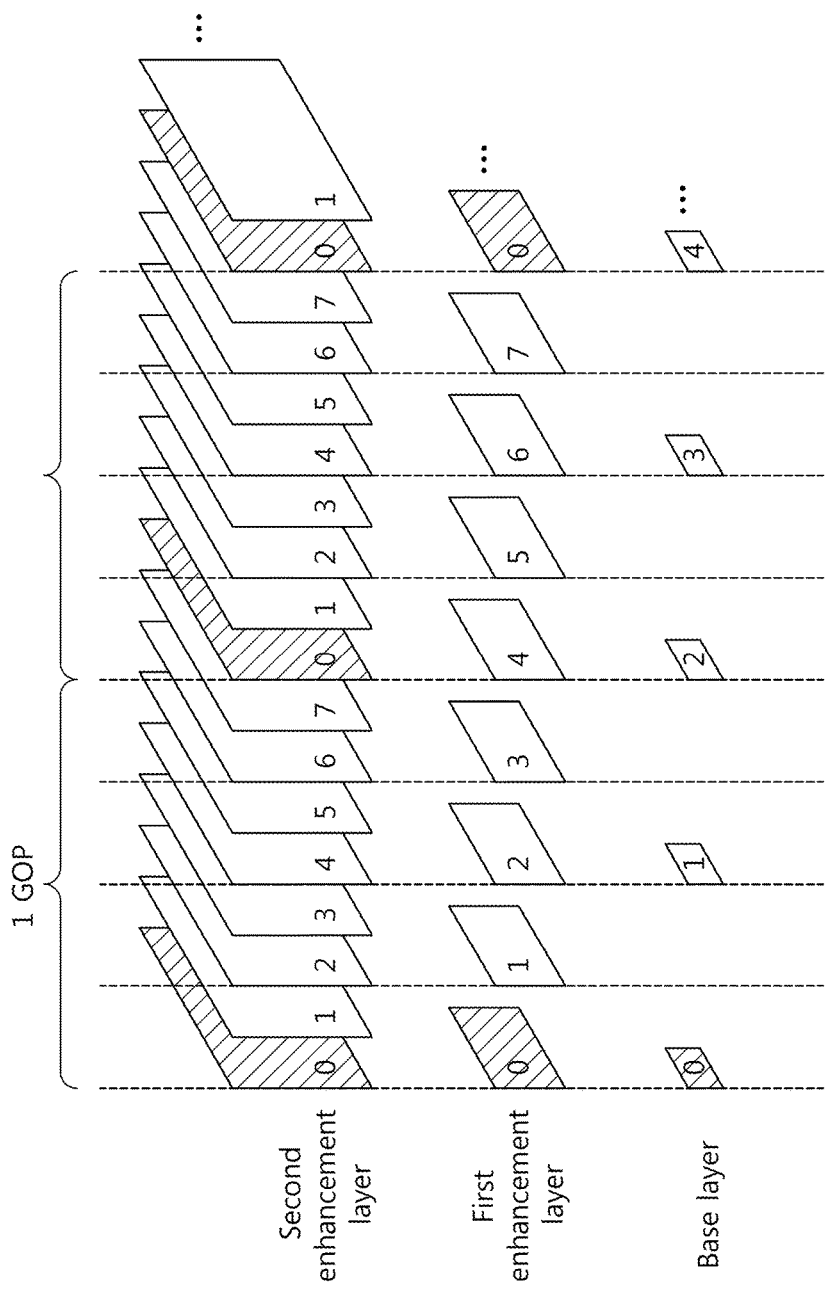
FIG. 3 schematically illustrates a scalable video coding structure using multiple layers according to an exemplary embodiment of the present invention.

FIG. 3 schematically illustrates a scalable video coding structure using multiple layers according to an exemplary embodiment of the present invention. In FIG. 3, Group of Picture (GOP) denotes a picture group, that is, a group of pictures.

A transmission medium is needed to transmit video data, and each transmission medium may exhibit different performance depending on various network environments. A scalable video coding method is provided for various transmission media and network environments.

The scalable video coding method is a coding scheme of removing redundancy between layers by utilizing texture information, motion information and residual signals between layers to enhance encoding and decoding performance. The scalable video coding method may provide various scalability in spatial, temporal and quality aspects according to surrounding conditions such as transmission bit rate, transmission error rate and system resources.

Scalable video coding may be performed using a multi-layer structure so as to provide a bitstream applicable to diverse network circumstances. For example, the scalable video coding structure may include a base layer for compressing video data using a general video decoding method and an enhancement layer for compressing video data using decoding information of the base layer and a general video decoding method.

Here, a layer is a set of a video and a bitstream classified according to a spatial aspect (e.g., video size), temporal aspect (e.g., decoding order, video output order and frame rate), quality or complexity. Further, the base layer may denote a reference layer or a basic layer, while the enhancement layer may denote an enhancing layer. Multiple layers may have dependency on each other.

For instance, Referring to FIG. 3, the base layer may be defined by standard definition (SD), a frame rate of 15 Hz and a bit rate of 1 Mbps, a first enhancement layer by high definition (HD), a frame rate of 30 Hz and a bit rate of 3.9 Mbps, and a second enhancement layer by ultrahigh definition (4K-UHD), a frame rate of 60 Hz and a bit rate of 27.2 Mbps. The aforementioned formats, frame rates and bit rates are provided only for illustrative purposes and may be changed and modified as needed. Also, a different number of layers may be used depending on circumstances.

For example, when a transmission bandwidth is 40 Mbps, the first enhancement layer may be transmitted at a frame rate of 15 Hz or less by reducing the HD frame rate. The scalable video coding method may provide scalability in temporal, spatial and quality aspects using the method described above with reference to FIG. 3.

Scalable video coding may refer to scalable video encoding from an encoding perspective and to scalable video decoding from a decoding perspective hereinafter.

As described above, scalability is an important function of a current video format due to heterogeneous communication networks and various types of terminals.

Meanwhile, a bitstream including multi-layers is formed of network abstraction layer (NAL) units which facilitate adaptive transmission of a video through a packet switching network. Similarly to a case of the multi-layers, in multi-view video coding including a plurality of multi-view videos, relationship between multi-views is similar to relationship between spatial layers in a video comprising the mult-layers.

Figure 4:
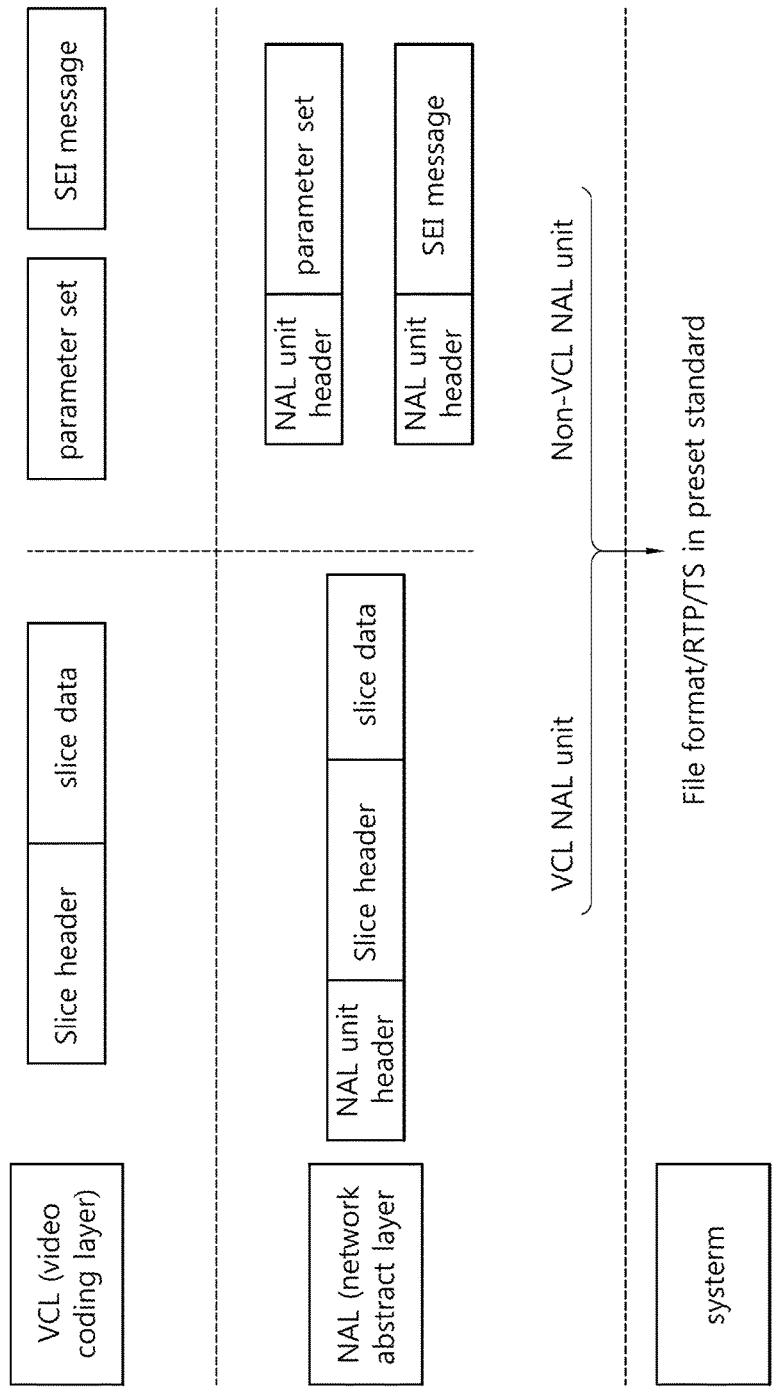
FIG. 4 illustrates a layered structure of a coded video processed by the decoding apparatus.

FIG. 4 illustrates a layered structure of a coded video processed by the decoding apparatus.

The coded video is divided into a video coding layer (VCL) for decoding a video and dealing with the video itself and an NAL located between the VCL and a lower system, the lower system transmitting and storing encoded information.

An NAL unit as a basic unit of the NAL serves to map the coded video onto a bit string of the lower system, such as a file format in accordance with a preset standard, a real-time transport protocol (RTP) and a transport stream (TS).

Meanwhile, regarding the VLC, a parameter set (picture parameter set, sequence parameter set and video parameter set) corresponding to a header of a sequence and a picture and a supplemental enhancement information (SEI) message additionally needed for a video decoding process are separated from information on the video (slice data). The VCL storing the information on the video includes slice data and a slice header.

As shown in FIG. 4, the NAL unit includes two parts of an NAL unit header and a raw byte sequence payload (RBSP, resulting data from video compression) generated in the VCL. The NAL unit header includes information on a type of the NAL unit.

The NAL unit is divided into a VCL NAL unit and a non-VCL NAL unit depending on the RBSP generated in the VCL. The VCL NAL unit is an NAL unit including the information on the video, and the non-VCL NAL unit is an NAL unit including the information (parameter set or SEI message) needed for decoding the video.

The VCL NAL unit may be divided into different types according to properties and types of a picture included in the NAL unit.

Meanwhile, scalability information on a bitstream is very crucial so as to effectively and efficiently transform the bitstream at every node on a content delivery path. In high efficiency video coding as a video coding specification for a single layer, the NAL unit header includes information on two fields, temporal_id and reserved_one_5bits, related to scalability information. temporal_id with a 3-bit length represents a temporal layer, and reserved_one_5bits is an area for representing another layer information later. The temporal layer denotes a layer of a bitstream formed of a VCL NAL unit and temporally scalable and has a specific temporal_id value.

The present invention is directed to effectively describe extraction information and scalability information on a video in a bitstream supporting multi-layers and discloses a method and an apparatus for signaling such information.

For convenience of description, a bitstream is divided into two types hereinafter. A bitstream supporting temporal scalability only is represented as a base type, while a bitstream supporting temporal, spatial, quality and viewpoint scalability is represented as an extended type.

Table 1 illustrates a syntax of the NAL unit header encoded by the encoding apparatus and decoded by the decoding apparatus according to an exemplary embodiment of the present invention.

TABLE 1

| | Descriptor |
|---|---|
| nal_unit( NumBytesInNALunit ) { | |
|   forbidden_zero_bit | f(1) |
|   nal_ref_flag | u(1) |

TABLE 1-continued

| | Descriptor |
|---|---|
|   nal_unit_type | u(6) |
|   if (nal_unit_type indicate HEVC NAL unit) | |
|   { | |
|     reserved_one_5bits | u(5) |
|     temporal_id | u(3) |
|   } | |
|   else | |
|   { | |
|     layer_id | u(8) |
|   } | |
|   NumBytesInRBSP = 0 | |
|   nalUnitHeaderBytes = 2 | |
|   for( i = nalUnitHeaderBytes; i < NumBytesInNALunit; i++ ) { | |
|     if( i + 2 < NumBytesInNALunit && next_bits( 24 ) = = 0x000003 ) | |
|   { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
|   } | |
| } | |

In Table 1, among information included in the NAL unit header, forbidden_zero_bit is set to 0.

nal_unit_type denotes a data structure of the RBSP included in the NAL unit and has a plurality of types based on the data structure of the RBSP.

nal_ref_flag is a flag indicating information on whether the NAL unit is a non-reference picture or a reference picture in the entire bitstream at encoding time. If nal_ref_flag is 1, the NAL unit includes a sequence parameter set (SPS), a picture parameter set (PPS), an adaptation parameter set (APS) or a slice of the reference picture. If nal_ref_flag is 0, the NAL unit includes a slice including part or whole of the non-reference picture.

reserved_one_5bits, as information available for the extended type supporting scalability such as a 3D video coding extended type, is used to identify additional layers present in a coded video sequence (CVS). The layers may be a spatial scalable layer, a quality scalable layer, a texture view or a depth view.

When a bitstream is the base type, reserved_one_5bits is 0, which may be used to determine an amount of data included in a decoding unit of the bitstream.

temporal_id is an identifier of a temporal layer for the NAL unit.

layer_id is a layer identifier for an NAL unit, and all VCL NAL units for one access unit has the same layer_id value. layer_id may be signaled in 8 bits.

As shown in Table 1, when nal_unit_type supports a single-layer bitstream, that is, a bitstream is the base type, reserved_one_5bits and temporal_id are sequentially encoded and transmitted to the decoding apparatus. When the bitstream is the extended type, layer_id is encoded and transmitted to the decoding apparatus.

For example, signaling is carried out in order of reserved_one_5bits and temporal_id in a base layer or basic layer, and layer_id as a combination of reserved_one_5bits and temporal_id may be signaled in an extended layer.

layer_id may be additionally signaled not only in the NAL unit header but also in a video parameter set (VPS).

Meanwhile, the NAL unit header has a fixed size of 2 bytes, and all required information is transmitted within a 2-byte space.

The base-type bitstream supports temporal scalability only, which is described by the temporal_id syntax. However, in the extended type, the layer information or dependency information may need to be included in the NAL unit header and reserved_one_5bits, which is not used for the base type, is used to transmit such information.

reserved_one_5bits is a 5-bit signal, which may be insufficient to transmit all required information for the extended type. That is, all 32 layers may be expressed with 5 bits, but 5 bits are insufficient to identify all layers when a bitstream supports a large number of scalability types or a plurality of view layers.

Conventionally, temporal_id is signaled before reserved_one_5bits in the NAL unit header. That is, temporal_id is signaled first to identify the temporal layer, and then reserved_one_5bits for identifying a layer used for the extended type is signaled. Separation between temporal scalability and different types of scalability may cause confusion. Temporal scalability is a form of scalability, in which case temporal scalability may be considered similar to other types of scalability.

Furthermore, when temporal_id is signaled before reserved_one_5bits, 3 bits are mandatorily allocated to describe temporal scalability. However, temporal scalability is not always used, and an extended-type bitstream may not support temporal scalability but support a different type of scalability. In this case, 3 bits allocated for temporal scalability is unnecessary information. Unnecessary temporal_id may be used to describe other types of scalability.

Considering this, in the present invention, temporal_id is used as one information to identify a layer in the extended-type bitstream. That is, the extended type uses not only reserved_one_5bits but also a combination of reserved_one_5bits and temporal_id to identify a layer.

Further, when reserved_one_5bits is signaled before temporal_id in different order from conventional signaling order of reserved_one_5bits and temporal_id, parsing efficiency increases. Conventionally, parsing is performed on 3-bit temporal_id first and then on 5-bit reserved_one_5bits. In the present invention, however, two pieces of information, that is, reserved_one_5bits and temporal_id, may be parsed at a time. That is, a 8-bit bitstream may be read at once, instead of reading a 5-bit bitstream and a 3-bit bitstream in twice.

A number of parsing times may vary on signaling order of reserved_one_5bits and temporal_id. For example, when a temporal_id value is 101 and temporal_id is signaled later, a value resulting from parsing reserved_one_5bits and temporal_id is 00000101. When temporal_id is signaled first, a parsing value is 10100000. When temporal_id is signaled first according to the conventional method, the decoding apparatus need to parse a bitstream in twice.

Further, if 8 bits are needed to signal layer_id, simultaneously parsing reserved_one_5bits and temporal_id is considered similar to parsing layer_id, thereby improving parsing efficiency.

As in the present invention, when temporal_id is used as one information to identify a layer in the extended-type bitstream, 8 bits may be used to identify the layer, thus expressing an increasing number of layers to 256 from 32 in the conventional method.

Further, in the present invention, since temporal scalability is regarded the same as other types of scalability, confusion about whether temporal scalability is the same as other types of scalability is avoided. Moreover, since temporal_id may be combined with other types of scalability for use, scalability may be expressed in diverse ways.

Also, in a bitstream not applying temporal scalability, a bit allocated for temporal scalability in the bitstream may be usefully utilized to describe other type of scalability.

Table 2 illustrates a syntax of the NAL unit header according to another exemplary embodiment of the present invention.

TABLE 2

|  | Descriptor |
|---|---|
| nal_unit( NumBytesInNALunit ) { | |
|   forbidden_zero_bit | f(1) |
|   nal_ref_flag | u(1) |
|   nal_unit_type | u(6) |
|   layer_id | u(8) |
|   NumBytesInRBSP = 0 | |
|   nalUnitHeaderBytes = 2 | |
|   for( i = nalUnitHeaderBytes; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

As illustrated in Table 2, layer_id is a temporal identifier for the NAL unit. All VCL NAL units for one access unit have the same layer_id. In a bitstream supporting a single layer, layer_id ranges from 0 to 7. In an access unit as a random access point, layer_id of all VCL NAL units for the access unit is 0.

In the present embodiment, layer_id as a new syntax resulting from combination of reserved_one_5bits and temporal_i is used. As described above, the bitstream supporting the single layer, that is, the base type, may have layer_id ranging from 0 to 7, in which case layer_id may be used as a syntax signalinh the same information as temporal_id.

Meanwhile, if all non-reference pictures, particularly non-reference pictures corresponding to most top temporal layers, are extracted, nal_ref_flag of all remaining picture after extraction is 1. However, some pictures of the extracted bitstream, that is, pictures corresponding to top temporal layers in the remaining bitstream, become non-reference pictures even though nal_ref_flag is 1.

Thus, a bit allocated to nal_ref_flag may be used for another syntax element of the NAL unit header, for example, temporal_id or reserved_one_5bits. If one bit allocated to nal_ref_flag is used for temporal_id or reserved_one_5bits, a greater number of layers included in the bitstream may be identified.

For example, when one bit allocated to nal_ref_flag is used for reserved_one_5bits, reserved_one_5bits has one bit more to become a 6-bit signal.

As described above, the NAL unit may be divided into different types according to properties and types of a picture included in the NAL unit.

Table 3 illustrates an example of an NAL unit type.

TABLE 3

| nal_unit_type | Content of NAL unit and RBSP syntax structure | NAL unit type class |
|---|---|---|
| 0 | Unspecified | non-VCL |
| 1 | Coded slice of a non-RAP, non-TFD and non-TLA picture slice_layer_rbsp( ) | VCL |

TABLE 3-continued

| nal_unit_type | Content of NAL unit and RBSP syntax structure | NAL unit type class |
|---|---|---|
| 2 | Coded slice of a TFD picture slice_layer_rbsp( ) | VCL |
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |
| 8 | Coded slice of an IDR picture slice_layer_rbsp( ) | VCL |
| 9 . . . 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32 . . . 47 | Reserved | n/a |
| 48 . . . 63 | Unspecified | non-VCL |

As illustrated in Table 3, the NAL unit may be divided into a VCL NAL unit and a non-VCL NAL unit depending on whether the NAL unit includes information on a video. The VCL NAL unit is an NAL unit including the information on the video, and the non-VCL NAL unit is an NAL unit including information (parameter set or SEI message) needed for decoding the video.

The VCL NAL unit may be divided into a random access picture and a random inaccess picture. In Table 3, NAL units with nal_unit_type of 4 to 8 are random access pictures, and NAL units with nal_unit_type of 1 to 3 are not random access pictures.

Figure 5:
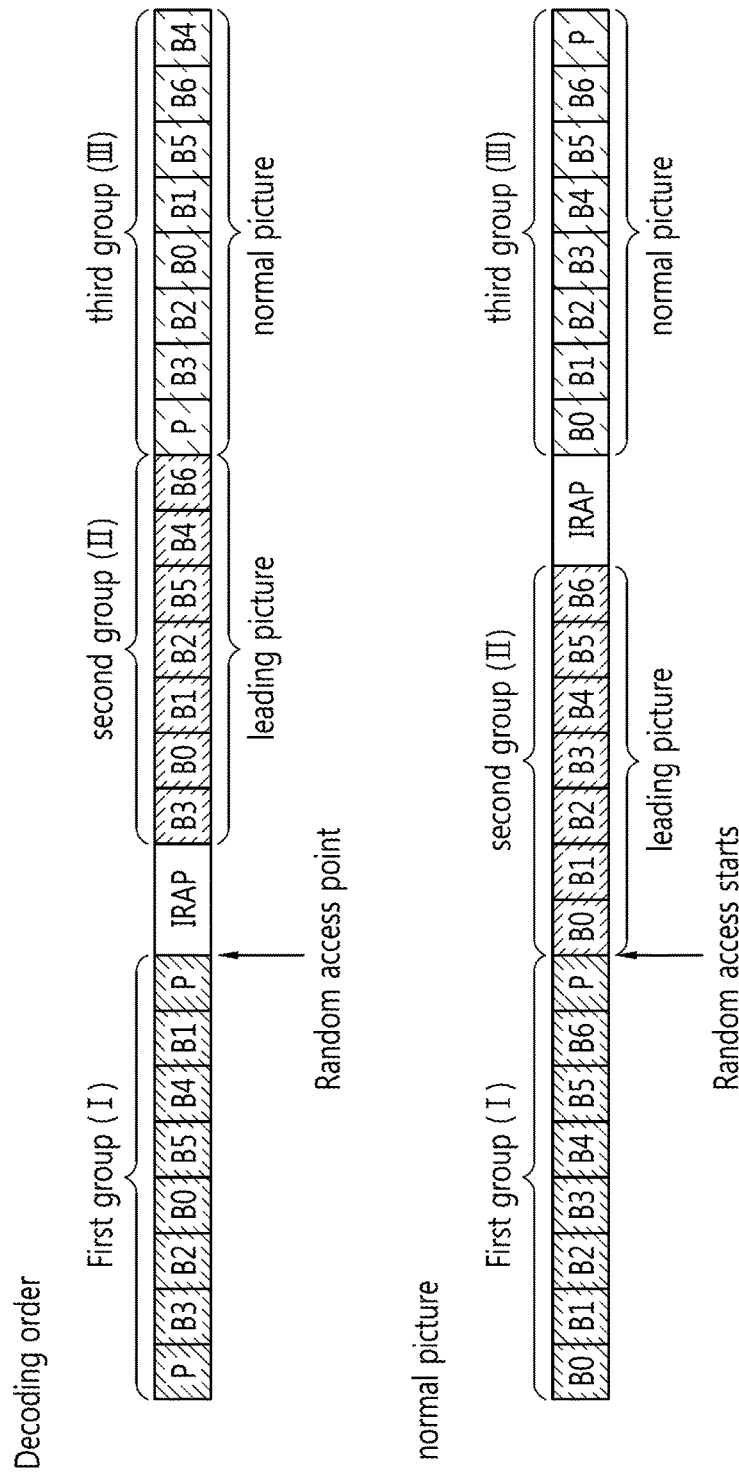
FIG. 5 illustrates a random access picture.

FIG. 5 illustrates a random access picture.

The random access picture, that is, an intra random access point (TRAP) picture as a random access point, is a first picture of a bitstream in decoding order at random access and includes I slices only.

FIG. 5 shows output order or display order and decoding order of pictures. As shown in FIG. 5, the output order of the pictures may be different from the decoding order of the pictures. For convenience of description, the pictures are divided into groups.

Pictures in a first group (I) precede the IRAP picture in terms of both output order and decoding order, while pictures in a second group (II) precede the IRAP picture in terms of output order but follows the IRAP picture in terms of decoding order. Pictures in a third group (III) follows the IRAP picture in terms of both output order and decoding order.

The pictures in the first group (I) may be decoded and output regardless of the IRAP picture.

The pictures in the second group (II) output before the IRAP picture are referred to leading pictures, which may cause a problem in a decoding process when the IRAP picture is used as a random access point.

The pictures in the third group (III) following the IRAP picture in terms of output and decoding order are referred to as normal pictures. The normal pictures are not used as a reference picture of the leading pictures.

A random access point in a bitstream at which random access happens is the IRAP picture, and random access starts as a first picture in the second group (II) is output.

Meanwhile, the IRAP picture may be any one of an instantaneous decoding refresh (IDR) picture, a clean random access (CRA) picture and a broken link access (BLA) picture.

Figure 6:
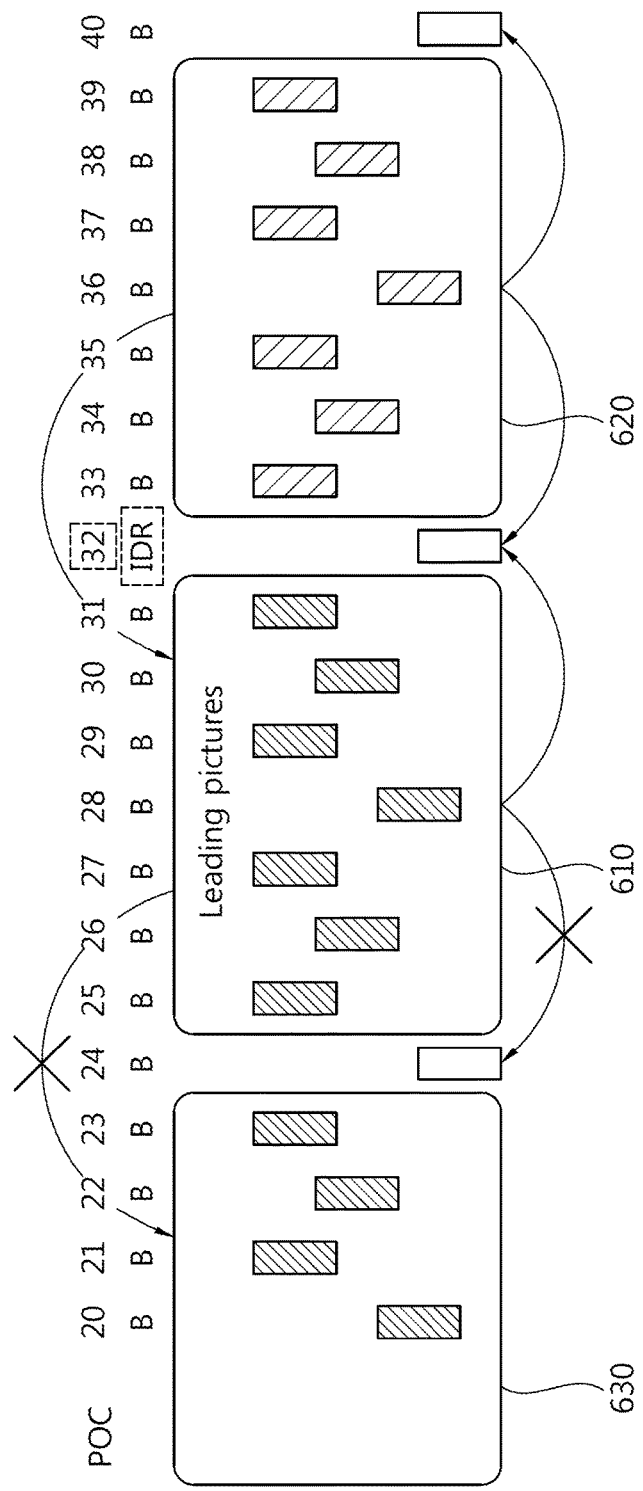
FIG. 6 illustrates an IDR picture.

FIG. 6 illustrates an IDR picture.

The IDR picture is a picture that is a random access point when a picture group (GOP) has a closed structure. The IDR picture is the IRAP picture and thus includes I slices only. The IRD picture may be a first picture in a decoding procedure or appear in the middle of a bitstream. When the IDR picture is decoded, all reference pictures stored in a decoded picture buffer (DPB) are indicated as "unused for reference."

In FIG. 6, a bar represents a picture, and an arrow indicates reference relationship as to whether one picture can use another picture as a reference picture. An x mark on the arrow indicates that picture(s) cannot refer to a picture indicated by an arrow.

As shown in FIG. 6, a POC of the IDR picture is 32, and pictures having a POC ranging from 25 to 31 and being output before the IDR picture are leading pictures 610. Pictures having a POC greater than 33 are normal pictures.

The leading pictures 610 preceding the IDR picture may use the IDR picture and other leading pictures as reference pictures but may not use a previous picture 630 preceding the leading pictures 610.

The normal pictures 620 following the IDR picture may be decoded by referring to the IDR picture, the leading pictures and other normal pictures.

Figure 7:
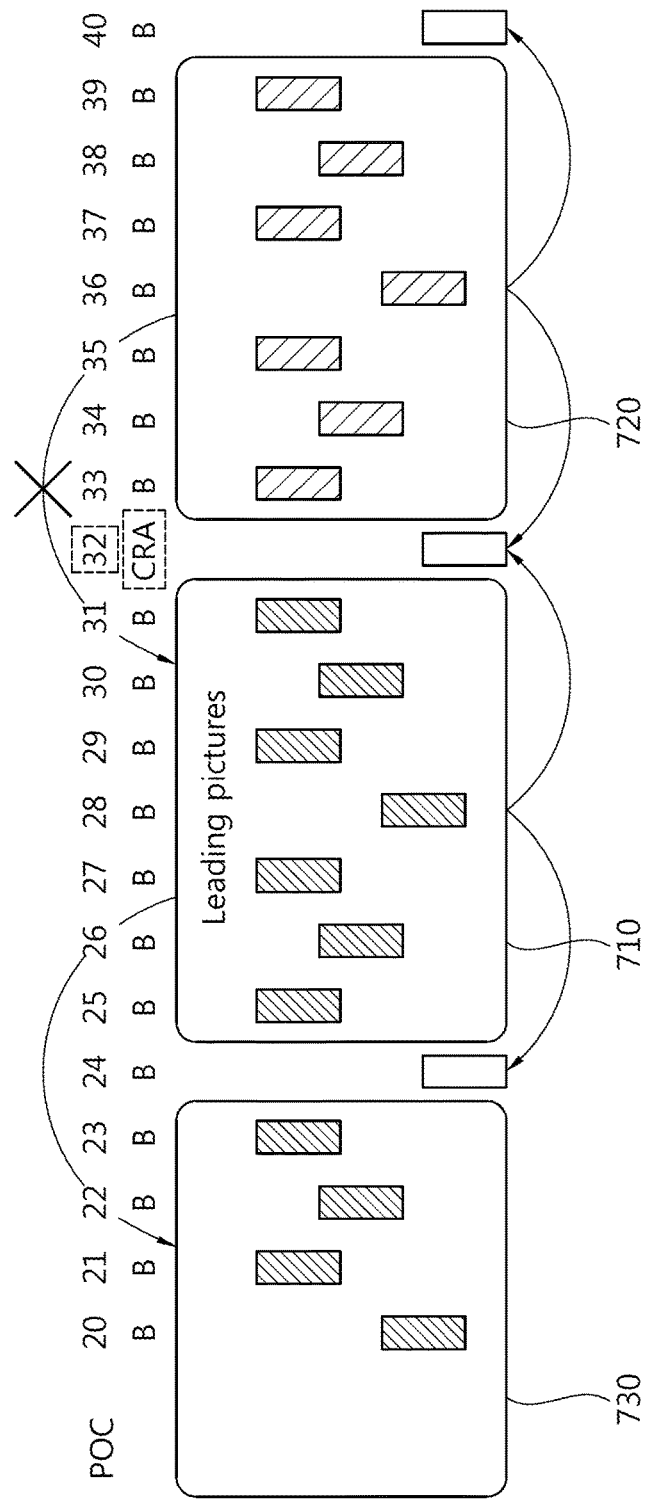
FIG. 7 illustrates a CRA picture.

FIG. 7 illustrates a CRA picture.

The CRA picture a picture that is a random access point when a picture group (GOP) has an open structure. The CRA picture is also the IRAP picture and thus includes I slices only. The IRD picture may be a first picture in a bitstream in a decoding procedure or appear in the middle of the bitstream for normal play.

In FIG. 7, a bar represents a picture, and an arrow indicates reference relationship as to whether one picture can use another picture as a reference picture. An x mark on the arrow indicates that picture(s) cannot refer to a picture indicated by an arrow.

Leading pictures 710 preceding the CRA picture may use all of the CRA picture, other leading pictures and a previous picture 730 preceding the leading pictures 710 as reference pictures.

However, normal pictures 720 following the CRA picture may be decoded by referring to the CRA picture and other normal pictures but may not use the leading pictures 710 as reference pictures.

A BLA picture is a picture which has similar functions and properties to those of the CRA picture and is present in the middle of a bitstream as a random access point when coded pictures are spliced or the bitstream is broken in the middle. However, since the BLA picture is considered as a start of a new sequence, all parameter information on a video is received again when the BLA picture is received by a decoder, unlike the CRA picture.

The BLA picture may be determined by the encoding apparatus, or a system receiving a bitstream from the encoding apparatus may change a received CRA picture into a BLA picture. For example, when bitstreams are spliced, the system changes a CRA picture into a BLA picture and transmits the BLA picture to the decoder for decoding a video. Here, refreshed parameter information on the video is also provided from the system to the decoder. In the present invention, the decoder refers to any device including an image processing unit to decode a video, which may be the decoding apparatus of FIG. 2 or a decoding module for processing a video as a core module.

Referring back to Table 3, a tagged for discard (TED) picture is an un-decodable leading picture which may be discarded. The TED picture is a picture which is not normally decoded, as referring to an unavailable reference picture, and is excluded in decoding and output procedures.

A temporal layer access (TLA) picture is a picture indicating an up switching-possible location in temporal scalability, which indicates whether up switching is possible in a sub-layer including the TLA picture or a sub-layer having termporal_id greater than the TLA picture.

In Table 3, nal_unit_type representing a CRA picture is 4 and 5, and nal_unit_type representing a BLA picture is 6 and 7. The CRA pictures and the BLA pictures may be classified as follows.

Type 4: Coded slice of a CRAT (CRA with TFD) picture
Type 5: Coded slice of a CRANT (CRA with no TFD) picture
Type 6: Coded slice of a BLAT (Broken link access unit with TFD) picture
Type 7: Coded slice of a BLANT (Broken link access unit with no TFD) picture However, the pictures with nal_unit_type being 4 to 7 may be redundant in dividing the CRA pictures and the BLA pictures. Distinguishing between a CRA picture with a TFD picture and a CRA picture with no TFD picture is obscure, and it is not usefully distinguish whether the BLA pictures involve a TED picture. Thus, dividing the CRA pictures and the BLA pictures based on presence of a TFD picture unnecessarily adds redundancy to the NAL unit type, and distinguishing between the CRA pictures and between the BAL pictures is obscure, causing confusion.

Accordingly, an exemplary embodiment of the present invention suggests constructing the four types into two types in order to avoid redundancy of the NAL unit type.

A new NAL unit type is defined only with a CRA picture and a BLA picture regardless of presence of a TED picture. That is, the CRA pictures in Table 3 may be expressed as one type, instead of being divided into Type 4 and Type 5, and the BLA pictures may also be expressed as one type, instead of being divided into Type 6 and 7.

In the present invention, a picture which serves as a random access point and is followed by a TED picture is defined as a CRA picture and expressed as one NAL unit type.

In addition, a picture which is not followed by a TED picture until a new random access point is defined as a BLA picture and expressed as one NAL unit type. That is, no TED picture is present between the BLA picture and a next random access point.

In conclusion, a TED picture, a CRA picture and a BLA picture are expressed as independent NAL unit types, respectively, and the CRA picture and the BLA picture are just divided from each other based on presence of a following TED, each not being divided into two NAL unit types.

As such, simplifying functionally similar four NAL unit types into two types contributes to precise definition of NAL unit types and enables a decrease in complexity.

Figure 8:
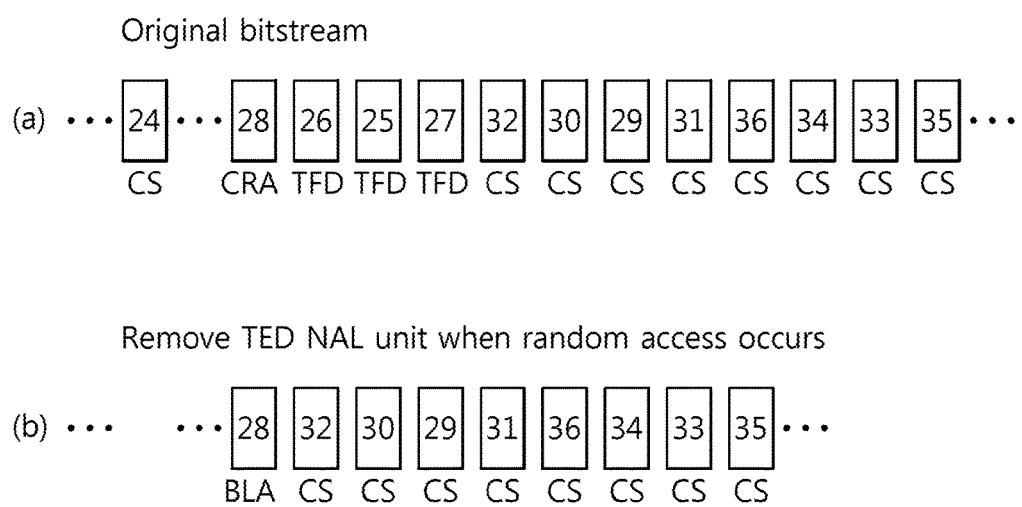
FIG. 8 illustrates a change of a CRA picture to a BLA picture according to an exemplary embodiment of the present invention.

FIG. 8 illustrates a change of a CRA picture to a BLA picture according to an exemplary embodiment of the present invention. FIG. 8(a) illustrates an original bitstream output from the encoding apparatus, and FIG. 8(b) illustrates a bitstream provided from a system to a decoder.

In FIG. 8, a coded slice (CS) refers to a normally encoded slice, and a numeral to identify a picture is output order of the picture, that is, POC.

When random access suddenly occurs to the bitstream in FIG. 8(a), a decoding process begins at a CRA picture. In this case, the system may change an NAL unit type of the CRA picture into a BAL picture as in FIG. 8(b) and remove all TED pictures following the CRA picture from the bitstream.

Subsequently, as in FIG. 8(b), the decoder receiving the bitstream may decode a BLA picture with a POC of 28 and sequentially decode following CSs. In this case, the decoder may decode following pictures after a predetermined period of delay time in order to maintain a picture bit string of the input bitstream, that is, to prevent an overflow or underflow of a buffer storing pictures.

Figure 9:
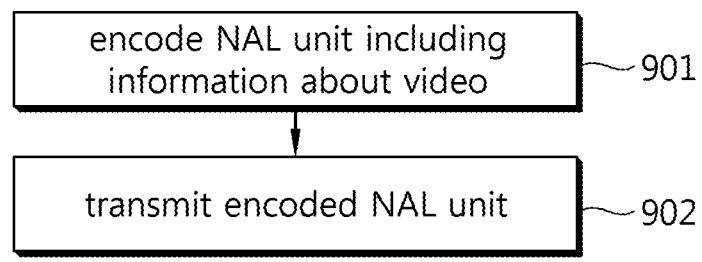
FIG. 9 is a flowchart illustrating a method of encoding video information according to the present invention.

FIG. 9 is a flowchart illustrating a method of encoding video information according to the present invention.

As shown in FIG. 9, the encoding apparatus may encode an NAL unit including information about a video (S910).

An NAL unit header includes layer identification information for identifying a scalable layer in a bitstream supporting the scalable layer. The layer identification information may be encoded as a syntax such as reserved_one_5bits and temporal_id or layer_id.

When the bitstream supports a single layer, the encoding apparatus sequentially encodes reserved_one_5bits and temporal_id. When the bitstream is not a base type but an extended type, the encoding apparatus may encode layer_id.

Alternatively, the encoding apparatus may combine reserved_one_5bits and temporal_id into layer_id as single syntax information and encode just the single syntax information regardless of a number of layers supported by the bitstream.

The encoding apparatus encodes information on an NAL unit type in the NAL unit header. A picture as a random access point among VCL NAL units includes an IDR picture, a CRA picture and a BLA picture, and a picture output prior to an IRAP picture is referred to as a leading picture.

Each picture is identified with different nal_unit_type information.

Conventionally, the CRA picture and the BLA picture each are expressed as two NAL unit types based on presence of a TED picture not decoded but removable from a bitstream among leading pictures.

The encoding apparatus according to the exemplary embodiment of the present invention encodes a TED picture, the CRA picture and the BLA picture as independent NAL unit types, respectively, regardless of presence of the TED picture and encode the CRA picture and the BLA picture separately based on presence of a following TED picture.

In another embodiment, the NAL unit header of the NAL unit may not include nal_ref_flag as information indicating whether the NAL unit includes a slice including at least part or whole of non-reference pictures.

Alternatively, when a decodable leading picture other than the TED picture is present among leading pictures encoded after the BLA picture, the encoding apparatus may encode the BLA picture as new nal_unit_type information to identify the decodable leading picture.

The encoding apparatus transmits the NAL unit including the information on the encoded video as a bitstream to the decoding apparatus (S902).

Figure 10:
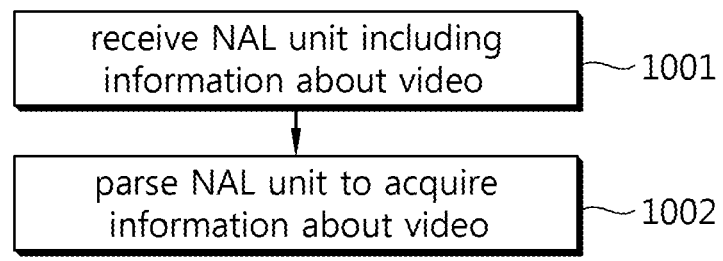
FIG. 10 is a flowchart illustrating a method of decoding the video information according to the present invention.

FIG. 10 is a flowchart illustrating a method of decoding the video information according to the present invention.

Referring to FIG. 10, the decoding apparatus receives the NAL unit including the information about the encoded video through the bitstream (S1001).

The NAL unit header includes nal_unit_type information to distinguish NAL units based on layer identification information for identifying the scalable layer in the bitstream supporting the scalable layer and properties.

The decoding apparatus parses the NAL unit header and an NAL payload (S1002). Parsing the video information may be carried out by the entropy decoding module or a separate parsing module.

The decoding apparatus may acquire various kinds of information included in the NAL unit header and the NAL payload through parsing.

The decoding apparatus receives reserved_one_5bits and temporal_id as information for identifying a layer in a bitstream supporting a single layer in order and parses the two pieces of information at a time. In this case, the information may be parsed in a similar pattern to a pattern for layer_id as information for identifying a layer in a bitstream supporting multiple layers.

The decoding apparatus may also parse nal_unit_type to divide pictures according to kind and process the video accordingly. For example, an IDR picture, a CRA picture and a BLA picture, which serve as a random access point, are subjected to video processing corresponding to an I slice, while a TED picture is not decoded.

When the decoding apparatus is able to change the CRA picture to the BLA picture, the decoding apparatus may remove the TED picture, received after a change to the BLA picture, from the bitstream or not decode the TED picture.

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples, combinations of the embodiments may be also understood as exemplary embodiments of the present invention. Thus, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A method of video decoding, the method comprising:
   receiving, by a decoding apparatus, a bitstream comprising a network abstraction layer (NAL) unit including information on a picture;
   obtaining, by the decoding apparatus, NAL unit type information from a NAL unit header of the NAL unit;
   deriving, by the decoding apparatus, a NAL unit type of a current picture based on the NAL unit type information; and
   decoding, by the decoding apparatus, the current picture based on the NAL unit type,
   wherein the NAL unit header includes layer id information specifying a layer identifier and temporal id information specifying a temporal identifier for the NAL unit,
   wherein, in the NAL unit header, a parsing order of the layer id information is prior to a parsing order of the temporal id information,
   wherein the NAL unit type for the current picture is one of NAL unit types including a clean random access (CRA) type to specify a CRA picture and a broken link access (BLA) type to specify a BLA picture, and
   wherein the CRA picture is a random access point picture and the CRA picture has a uniform NAL unit type regardless of a type of a leading picture associated with the CRA picture, wherein an output order of the leading picture is prior to an output order of the CRA picture.

2. The method of claim 1, wherein, in the NAL unit header, the temporal id information is represented by 3 bits.

3. The method of claim 1, wherein the leading picture is one of a first leading picture to be skipped for outputting and a second leading picture to be decoded.

4. The method of claim 3, wherein the first leading picture is not present after the BLA picture.

5. The method of claim 3, wherein the first leading picture is neither decoded nor output.

6. The method of claim 1, wherein the step of decoding the current picture comprises decoding I slices when the current picture is the CRA picture or the BLA picture.

7. The method of claim 1, wherein the BLA picture is present in a middle of the bitstream of a coded video sequence as a random access point when pictures in the coded video sequence are spliced or the bitstream is broken in the middle.

8. A method of video encoding, the method comprising:
   determining, by an encoding apparatus, a network abstraction layer (NAL) unit type of a current picture;
   deriving, by the encoding apparatus, NAL unit type information based on the determined NAL unit type;
   configuring, by the encoding apparatus, a NAL unit header including the NAL unit type information;
   configuring, by the encoding apparatus, a NAL unit including information on the current picture based on the NAL unit header; and
   generating, by the encoding apparatus, a bitstream comprising the NAL unit,
   wherein the NAL unit header includes layer id information specifying a layer identifier and temporal id information specifying a temporal identifier for the NAL unit,
   wherein the NAL unit header is configured so that a parsing order of the layer id information is prior to a parsing order of the temporal id information,
   wherein the NAL unit type for the current picture is one of NAL unit types including a clean random access (CRA) type to specify a CRA picture and a broken link access (BLA) type to specify a BLA picture, and
   wherein the CRA picture is a random access point picture and the CRA picture has a uniform NAL unit type regardless of a type of a leading picture associated with the CRA picture, wherein an output order of the leading picture is prior to an output order of the CRA picture.

9. The method of claim 8, wherein, in the NAL unit header, the temporal id information is represented by 3 bits.

10. The method of claim 8, wherein the leading picture is one of a first leading picture to be skipped for outputting and a second leading picture to be decoded.

11. A non-transitory decoder-readable storage medium storing a bitstream comprising information on a NAL unit generated by an encoder by determining a network abstraction layer (NAL) unit type of a current picture, by deriving NAL unit type information based on the determined NAL unit type, by configuring a NAL unit header including the NAL unit type information, by configuring a NAL unit including information on the current picture based on the NAL unit header, wherein the NAL unit header includes layer id information specifying a layer identifier and temporal id information specifying a temporal identifier for the NAL unit, wherein the NAL unit header is configured so that a parsing order of the layer id information is prior to a parsing order of the temporal id information, wherein the NAL unit type for the current picture is one of NAL unit types including a clean random access (CRA) type to specify a CRA picture and a broken link access (BLA) type to specify a BLA picture, and wherein the CRA picture is a random access point picture and the CRA picture has a uniform NAL unit type regardless of a type of a leading picture associated with the CRA picture, wherein an output order of the leading picture is prior to an output order of the CRA picture.

12. The non-transitory decoder-readable storage medium of claim 11, wherein, in the NAL unit header, the temporal id information is represented by 3 bits.

13. The non-transitory decoder-readable storage medium of claim 11, wherein the leading picture is one of a first leading picture to be skipped for outputting and a second leading picture to be decoded.

\* \* \* \* \*